US007412237B2

(12) United States Patent
Takahashi et al.

(10) Patent No.: US 7,412,237 B2
(45) Date of Patent: Aug. 12, 2008

(54) INFORMATION PROCESSING APPARATUS AND INFORMATION PROCESSING METHOD

(75) Inventors: Kei Takahashi, Tokyo (JP); Ryo Hatano, Tokyo (JP); Kenichi Tonouchi, Tokyo (JP); Kenichi Kaneko, Tokyo (JP)

(73) Assignee: Kabushiki Kaisha Toshiba, Toyko (JP)

( * ) Notice: Subject to any disclaimer, the term of this patent is extended or adjusted under 35 U.S.C. 154(b) by 172 days.

(21) Appl. No.: 10/528,020

(22) PCT Filed: Dec. 7, 2004

(86) PCT No.: PCT/JP2004/018532

§ 371 (c)(1),
(2), (4) Date: Feb. 21, 2006

(87) PCT Pub. No.: WO2005/057860

PCT Pub. Date: Jun. 23, 2005

(65) Prior Publication Data

US 2006/0264227 A1 Nov. 23, 2006

(30) Foreign Application Priority Data

Dec. 12, 2003 (JP) .............................. 2003-414595

(51) Int. Cl.
*H04Q 7/20* (2006.01)
(52) U.S. Cl. .................. 455/432.3; 455/435.3; 455/410; 455/452.2; 370/338
(58) Field of Classification Search .................. 370/338; 455/432.1–432.3, 435.1–435.3, 436–445, 455/450–453, 410–411, 115.3, 423

See application file for complete search history.

(56) References Cited

U.S. PATENT DOCUMENTS

2002/0004707 A1   1/2002  Klein
2002/0118664 A1*  8/2002  Ishibashi et al. ............ 370/338
2006/0069760 A1*  3/2006  Yeap et al. .................. 709/221

FOREIGN PATENT DOCUMENTS

EP   1 107 512 A1    6/2001
JP   11-205342       7/1999
JP   2002-252620     9/2002
JP   2003-244167     8/2003

OTHER PUBLICATIONS

European Search Report dated Apr. 5, 2006 for Appln. No. 04026568.8-2416.

* cited by examiner

*Primary Examiner*—George Eng
*Assistant Examiner*—Marcos L Torres
(74) *Attorney, Agent, or Firm*—Pillsbury Winthrop Shaw Pittman, LLP (57) ABSTRACT

When a personal computer which implements an information processing apparatus according to this invention discovers communicable access points, the personal computer acquires pieces of information of the discovered access points. These pieces of information include, for example, the network name, communication speed, security level, communication channel, and radio field strength. A communication profile to be used by the personal computer is determined on the basis of these pieces of information, communication profiles set for the access points, and the priority of a communication profile to be used by the personal computer. A connection process between the personal computer and a wireless relay apparatus is automatically performed using the determined communication profile.

10 Claims, 9 Drawing Sheets

Wireless LAN setting list (communication profile) 301

| SSID | Infrastructure mode | Authentication mode | Security setting | Other settings |
|---|---|---|---|---|
| SSID1 | Infrastructure | OPEN | WEP | · |
| SSID2 | Infrastructure | WPA | TKIP | · |
| SSID3 | Ad hoc | WPA | AES | · |
| ⋮ | ⋮ | ⋮ | ⋮ | ⋮ |

FIG. 4

AP list (AP information acquired by beacon reception) 401

| (SSID/BSSID) | Infrastructure mode | Key state | Radio field strength | Channel | Communication method |
|---|---|---|---|---|---|
| SSID1 | Infrastructure | ON | 18dB | 7 | 802.11g |
| SSID2 | Infrastructure | ON | 64dB | 42 | 802.11a |
| SSID3 | Ad hoc | OFF | 55dB | 11 | 802.11b |
| ⋮ | ⋮ | ⋮ | ⋮ | ⋮ | ⋮ |

INFORMATION PROCESSING APPARATUS AND INFORMATION PROCESSING METHOD

CROSS REFERENCE TO RELATED APPLICATION

This is the U.S. National Stage of PCT/JP2004/018532, filed Dec. 7, 2004, which in turn claims priority to Japanese Patent Application No. 2003-414595, filed Dec. 12, 2003, both of which are incorporated herein in their entirety by reference.

TECHNICAL FIELD

The present invention relates to an information processing apparatus and information processing method having a wireless communication function of performing network connection via a wireless relay apparatus.

BACKGROUND ART

Recent compact information processing devices such as a notebook-type personal computer and PDA have a function of discovering a peripheral wireless LAN access point in a use environment and performing network connection via the access point. A function of visually monitoring a network is also implemented.

When the user carries and uses such a portable personal computer, PDA, or the like, the wireless LAN must be set with respect to a peripheral wireless device upon a change in communication environment each time the personal computer, PDA, or the like is moved. A long time and much labor are required when the wireless LAN setting is switched by user operation. For example, a current automatic switching function for the wireless LAN setting as disclosed in Jpn. Pat. Appln. KOKAI Publication No. 2003-244167 provides only a fixed switching function for a given device. In this situation, demands have arisen for a user-friendly communication function considering the user's application purpose, environment, and the like.

DISCLOSURE OF INVENTION

The present invention has been made in consideration of the above situation, and has as its object to provide an information processing apparatus, information processing method, and program capable of reflecting the user's application purpose, environment, and the like with respect to a peripheral wireless device and very conveniently setting a communication environment.

According to a first aspect of the present invention, an information processing apparatus having a communication apparatus which performs network connection via a wireless relay apparatus comprises an information acquisition unit which acquires pieces of information of discovered wireless relay apparatuses by discovering the wireless relay apparatuses communicable with the communication apparatus, and a profile setting unit which sets communication profiles for the wireless relay apparatuses discovered by the information acquisition unit. The information processing apparatus further comprises a priority condition setting unit which sets a priority condition for deciding priorities of the communication profiles to be used by the communication apparatus, and a profile decision unit which decides a communication profile to be used by the communication apparatus on the basis of the pieces of information of the wireless relay apparatuses that are acquired by the information acquisition unit, the communication profiles set by the profile setting unit, and the priority condition set by the priority condition setting unit.

According to a second aspect of the present invention, a method of connecting a network via a wireless relay apparatus by using a communication apparatus comprises discovering wireless relay apparatuses communicable with the communication apparatus to acquire pieces of information of the discovered wireless relay apparatuses, setting communication profiles for the discovered wireless relay apparatuses, and setting a priority condition for deciding priorities of the communication profiles to be used by the communication apparatus. The method further comprises deciding a communication profile to be used by the communication apparatus on the basis of the pieces of acquired information of the wireless relay apparatuses, the set communication profiles, and the set priority condition.

According to a third aspect of the present invention, a program causes a computer which controls a communication apparatus for performing network connection via a wireless relay apparatus, to perform the following processes. More specifically, the program causes the computer to implement discovering wireless relay apparatuses communicable with the communication apparatus, acquiring pieces of information of the discovered wireless relay apparatuses, holding communication profiles set for the wireless relay apparatuses which communicate with the communication apparatus, holding a priority condition for deciding priorities of the communication profiles to be used by the communication apparatus, and deciding a communication profile to be used by the communication apparatus on the basis of the pieces of acquired information of the wireless relay apparatuses, the communication profiles, and the priority condition.

According to the present invention, a user-friendly communication environment in which the user's application purpose, environment, and the like are reflected can be set for a peripheral wireless device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

BEST MODE FOR CARRYING OUT THE INVENTION

A preferred embodiment of the present invention will be described below with reference to the several views of the accompanying drawing.

The outline of the operation according to the present invention will be explained with reference to FIG. 1.

Figure 1:
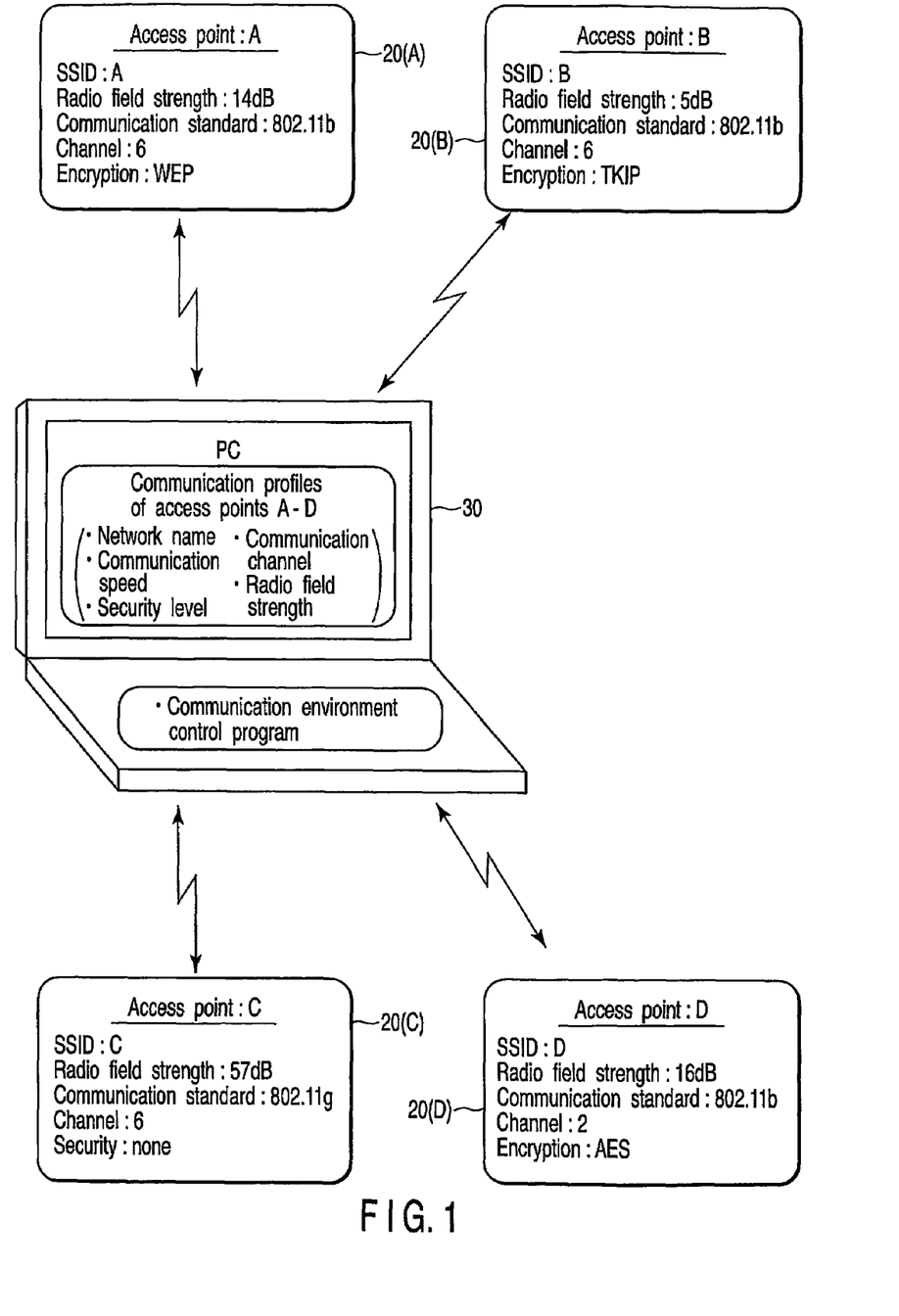
FIG. 1 is a conceptual view for explaining the outline of the operation of an information processing apparatus according to an embodiment of the present invention.

FIG. 1 illustrates the state of a wireless LAN for explaining the outline of the operation according to the present invention. FIG. 1 shows a communication environment in which a plurality of wireless relay apparatuses (access points A, B, C, and D) 20(A), 20(B), 20(C), and 20(D) communicable with a personal computer (PC) 30 exist around the personal computer 30. The user can set one of the network name, communication speed, security level, communication channel, and radio field strength as a wireless LAN connection condition in the personal computer 30.

The personal computer 30 has a wireless LAN card. The personal computer 30 receives beacons from the peripheral access points A, B, C, and D 20(A), 20(B), 20(C), and 20(D), and acquires their network names, the communication speeds of the communication devices, the security levels, the communication channels, and the radio field strengths.

The access point A 20(A) has "SSID: A, radio field strength: 14 dB, communication standard: 802.11b, channel: 6, encryption: WEP". The access point B 20(B) has "SSID: B, radio field strength: 5 dB, communication standard: 802.11b, channel: 6, encryption: TKIP". The access point C 20(C) has "SSID: C, radio field strength: 57 dB, communication standard: 802.11g, channel: 6, security: none". The access point D 20(D) has "SSID: D, radio field strength: 16 dB, communication standard: 802.11b, channel: 2, encryption: AES". The SSID (extended service set identity) is identification information (ID) for grouping access points or the like. WEP is an abbreviation for "Wired Equivalently Privacy", TKIP is an abbreviation for "Temporary Key Integrity Protocol", and AES is an abbreviation for "Advanced Encryption Standard".

In this communication environment, when "radio field strength" is set as an automatic switching condition for the wireless LAN setting in the personal computer 30, the wireless LAN is connected to an access point in a stronger radio field situation. In this case, the wireless LAN is automatically connected to the access point C 20(C) having the strongest radio field strength among the four access points A, B, C, and D 20(A), 20(B), 20(C), and 20(D).

When "security level" is set as an automatic switching condition for the wireless LAN setting, the wireless LAN is connected to an access point in a higher security situation. In this case, the wireless LAN is automatically connected to the access point D 20(D) which applies the highest-security-level AES among the four access points A, B, C, and D 20(A), 20(B), 20(C), and 20(D).

When "communication channel" is set as an automatic switching condition for the wireless LAN setting, the wireless LAN is connected to an access point using empty channels (smallest number of channels used). In the example shown in FIG. 1, the wireless LAN is automatically connected to the access point D 20(D) using the smallest number of channels among the four access points A, B, C, and D 20(A), 20(B), 20(C), and 20(D).

When "communication speed" is set as an automatic switching condition for the wireless LAN setting, the wireless LAN is connected to an access point having the highest communication speed. In the example shown in FIG. 1, the wireless LAN is automatically connected to the access point C 20(C) serving as an access point of the communication standard 802.11g which provides a communication speed higher than that of the communication standard 802.11b, among the four access points A, B, C, and D 20(A), 20(B), 20(C), and 20(D).

In this manner, according to the embodiment of the present invention, the wireless LAN setting is automatically switched in accordance with various communication conditions such as the communication speed of the communication device, the security level, the communication channel, and the radio field strength in a system having a wireless LAN card capable of setting a plurality of wireless LANs (setting communication profiles). The communication environment can always be automatically switched to the best one under a communication condition desired by the user without performing wireless LAN setting operation by the user upon a change in communication environment with respect to the access point 20.

The embodiment of the present invention which implements the above communication function will be described below.

Figure 2:
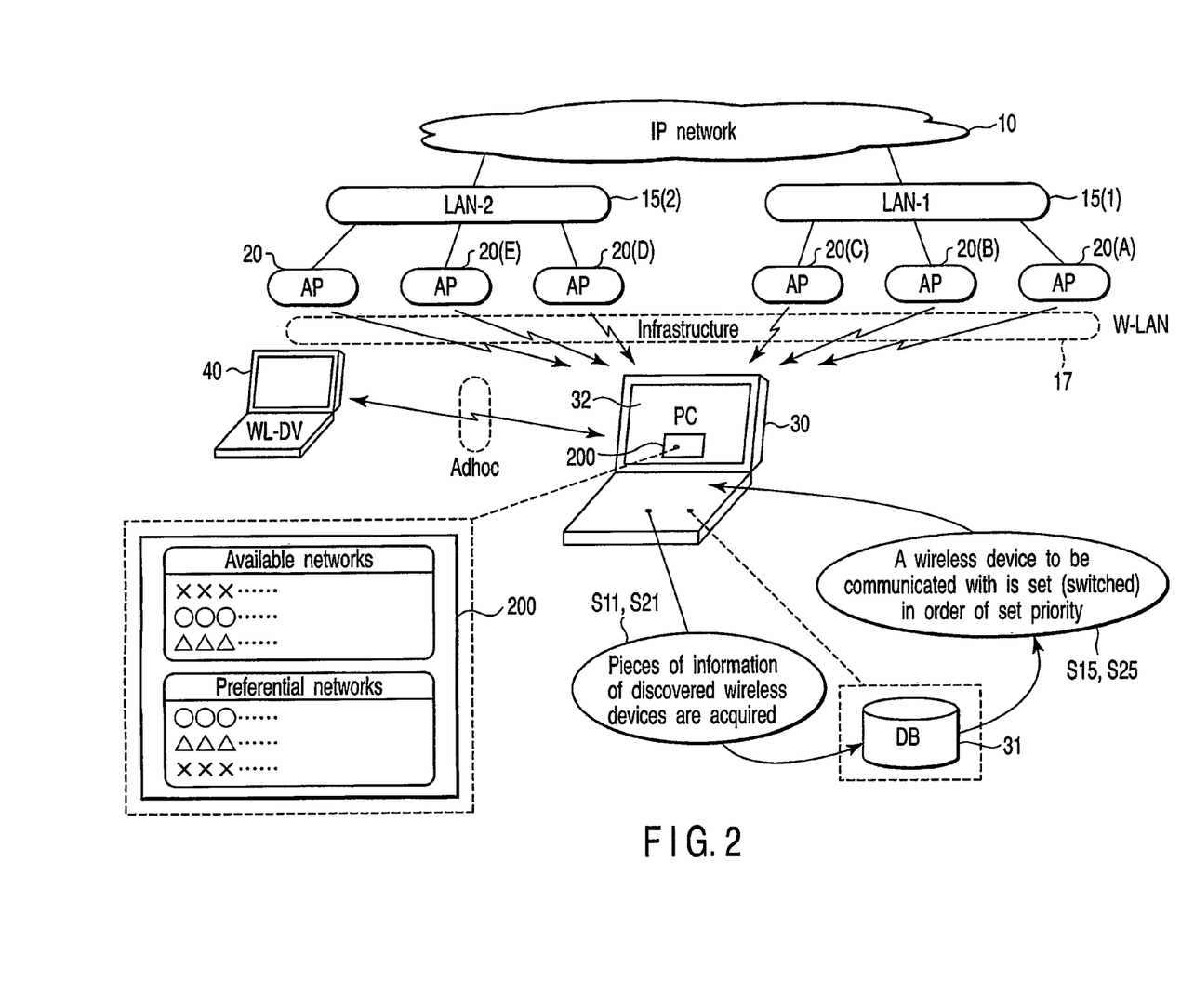
FIG. 2 is a view showing a system configuration for explaining the outline of the function of the information processing apparatus according to the embodiment of the present invention.

FIG. 2 shows an example of a system configuration for explaining the outline of the function of an information processing apparatus according to the embodiment of the present invention.

As shown in FIG. 2, a wireless LAN access area (W-LAN) 17 implements a communication network by LANs 15(1) and 15(2) which target specific areas, an IP network 10, and the like. Although not shown, each of the wireless LAN access area (W-LAN) 17 and the LANs 15(1) and 15(2) which target specific areas comprises a printer, network, file server, and various servers. The wireless LAN access area (W-LAN) 17 includes wireless LAN access points 20 for predetermined areas.

A client terminal is implemented by, e.g., a portable personal computer 30. The personal computer 30 has a wireless LAN device such as a wireless LAN card, and a communication environment control program. The personal computer 30 has a communication function of connecting the personal computer 30 via the wireless LAN to the access point 20 within the wireless LAN access area 17 and performing network connection between the personal computer 30 and an arbitrary device via various servers and the IP network 10.

Figure 3:
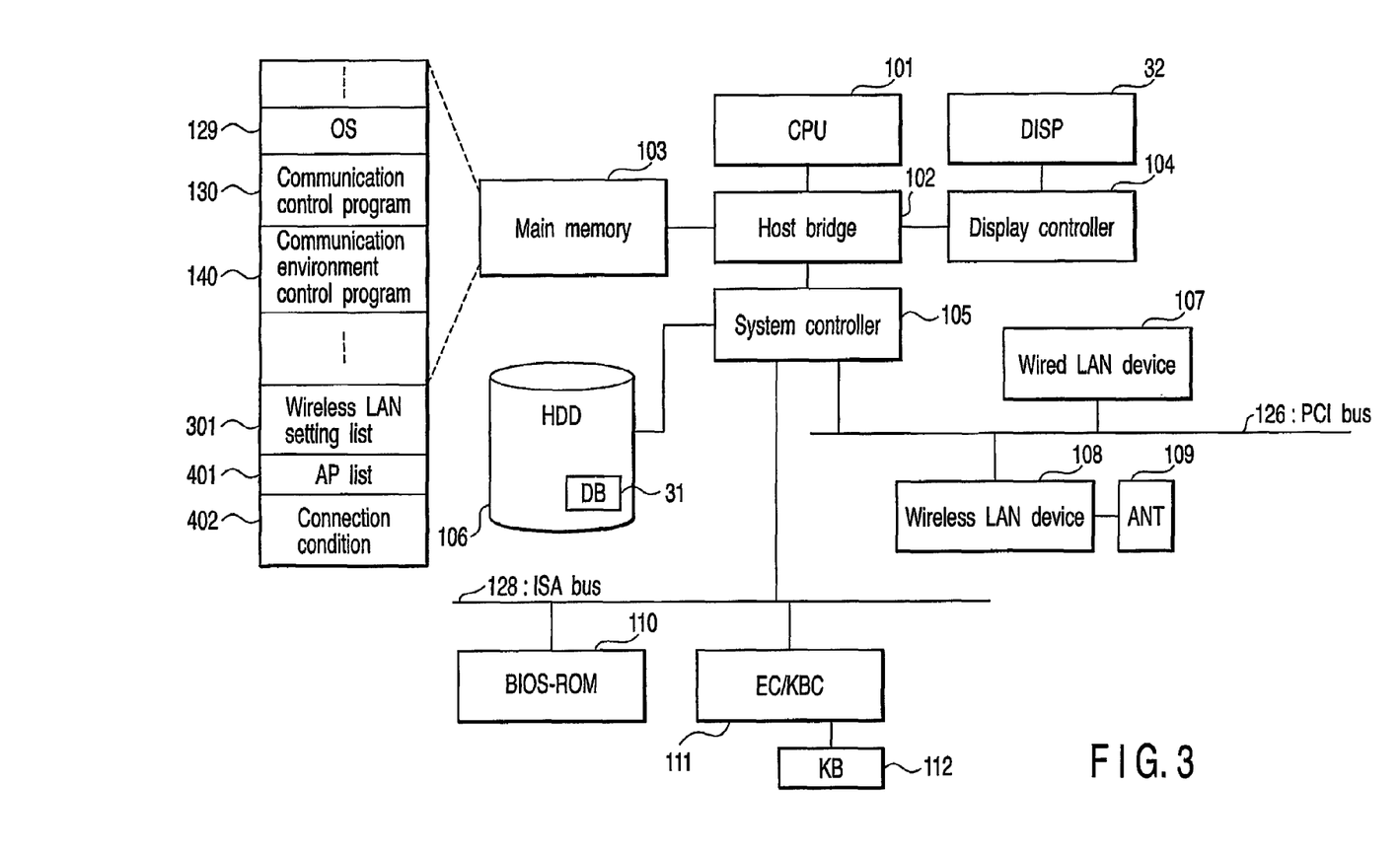
FIG. 3 is a block diagram showing the hardware configuration of the information processing apparatus according to the embodiment of the present invention.

The personal computer 30 incorporates a communication environment control program (140 in FIG. 3). The communication environment control program 140 has a display function and processing function (to be described later). The display function displays on a display 32 a setting window (initial setting window) 200 used to set a communication profile for enabling automatic wireless LAN setting (automatic access point switching), a priority condition for determining the priority of the wireless LAN, and the like. The processing function receives beacons from the peripheral access points 20, and discovers the access points 20. The processing function acquires and holds pieces of information such as the network names of the discovered access points 20, the communication speeds of the communication devices, the security levels, the communication channels, and the radio field strengths. A communication profile used in the wireless LAN is selected on the basis of the pieces of held information, and communication profiles (see FIG. 4) and wireless LAN priority conditions (see FIG. 10) which are set for a plurality of access points 20 by using the initial setting window 200 and held in a database 31. The communication environment can be automatically switched to the best one under a communication condition desired by the user. Functions realized by the communication environment control program will be described later with reference to FIGS. 4 to 10. The personal computer 30 can be connected to another wireless device (WL-DV) 40 via a wireless ad hoc network (Ad hoc).

The system configuration of the personal computer 30 will be explained with reference to FIG. 3.

As shown in FIG. 3, the personal computer 30 comprises a CPU 101, host bridge 102, main memory 103, display controller 104, system controller 105, hard disk drive (HDD) 106, wired LAN device 107, wireless LAN device 108, BIOS-ROM 110, and embedded controller/keyboard controller IC (EC/KBC) 111.

The CPU 101 is a processor adopted to control the operation of the personal computer 30. The CPU 101 executes an operating system (OS) 129 and various application/utility programs which are loaded from the hard disk drive (HDD) 106 to the main memory 103 via the system controller 105 and host bridge 102. The CPU 101 also executes a BIOS (Basic Input Output System) which are stored in the BIOS-ROM 110.

The CPU 101 executes a communication control program 130 stored in the main memory 103, in accordance with a predetermined setting condition (e.g., a predetermined time interval). The CPU 101 executes a predetermined application process associated with a communication service including monitoring and discovery of the peripheral access points 20, and acquisition of information (the network names of the access points, the communication speeds of the communication devices, the security levels, the communication channels, and the radio field strengths) of the discovered access points 20 (from which beacons are received).

The CPU 101 executes the communication environment control program 140 stored in the main memory 103, in accordance with, e.g., an icon selected by user from the start menu or task tray. The CPU 101 enables, on the initial setting window 200, communication profile setting targeting a plurality of communication profiles, wireless LAN priority condition setting, automatic communication profile switching setting, and the like. A concrete example of the structure of the initial setting window 200 will be described later with reference to FIG. 8.

Figure 4:
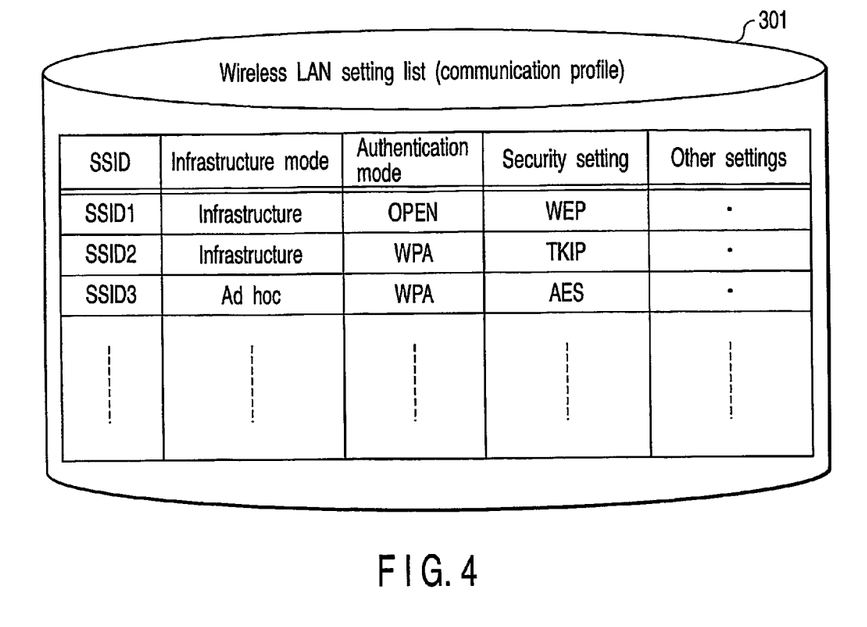
FIG. 4 is a view showing an example of the structure of a wireless LAN setting list.
Figure 5:
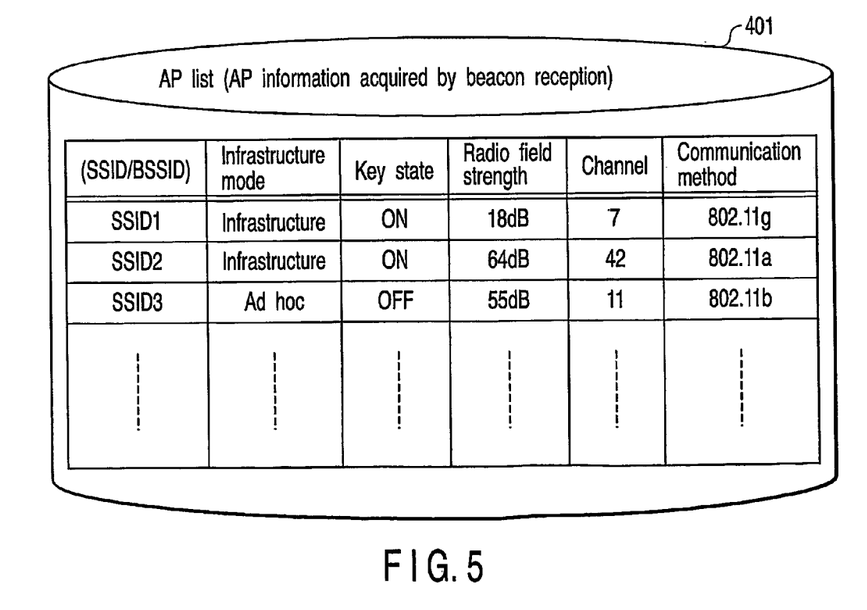
FIG. 5 is a view showing an example of the structure of an access point list.
Figure 6:
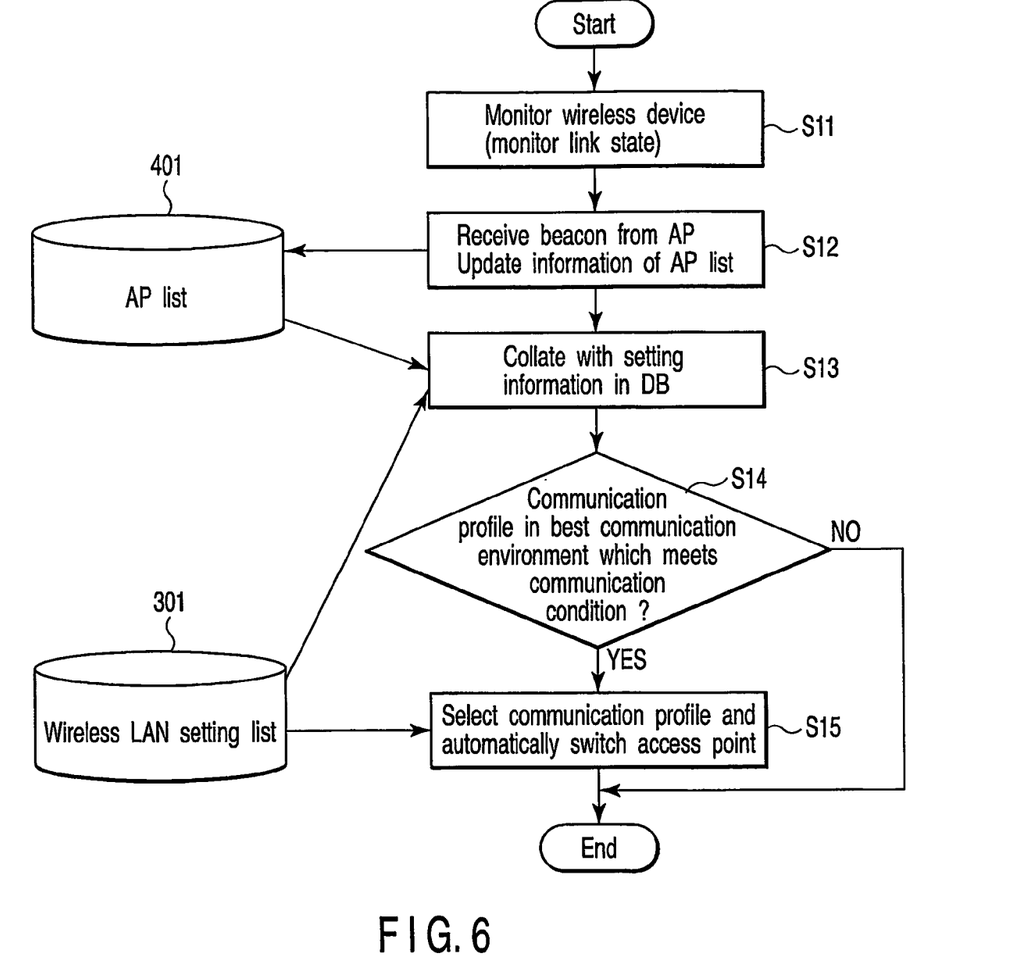
FIG. 6 is a flowchart showing an example of a communication profile selection process sequence applied to the information processing apparatus according to the embodiment of the present invention.
Figure 7:
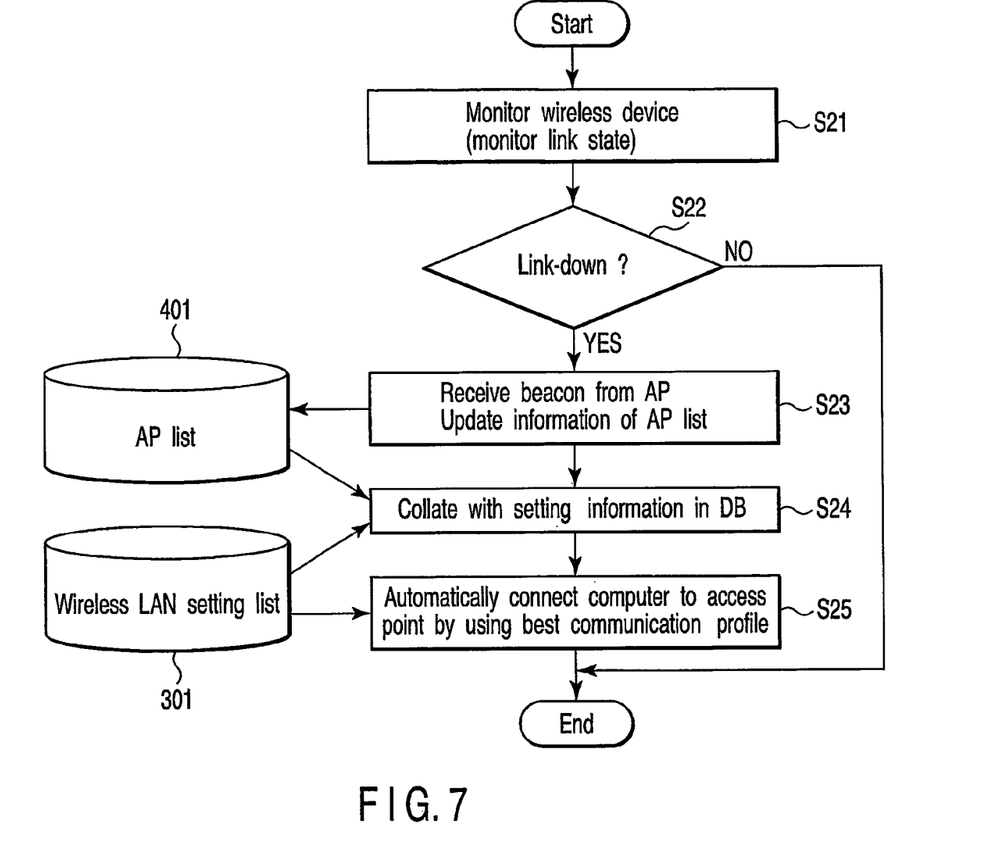
FIG. 7 is a flowchart showing another example of the communication profile selection process sequence applied to the information processing apparatus according to the embodiment of the present invention.
Figure 10:
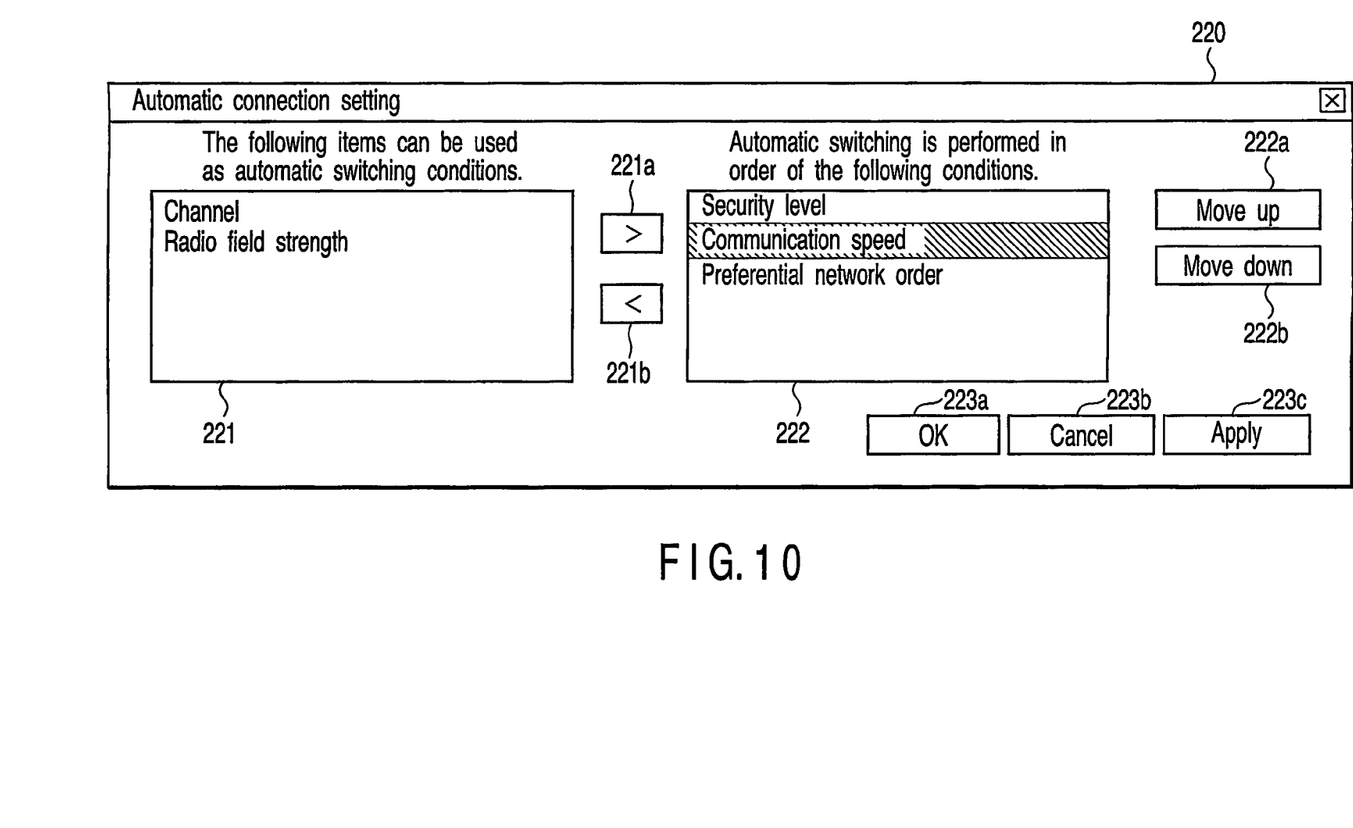
FIG. 10 is a schematic view showing an example of an automatic connection setting window applied to the information processing apparatus according to the embodiment of the present invention.

The CPU 101 acquires pieces of information such as the network names of the discovered access points 20, the communication speeds of the communication devices, the security levels, the communication channels, and the radio field strengths in the process of the communication environment control program 140 based on the settings using the initial setting window 200. The CPU 101 holds a list of pieces of information as an access point list (AP list) 401 in the main memory 103. The CPU 101 selects a communication profile used in the wireless LAN on the basis of these pieces of information, and communication profiles and wireless LAN priority conditions which are set for a plurality of access points 20 by using the setting window 200 and held in the database 31. This realizes the processing function capable of automatically switching the communication environment to the best one under a communication condition desired by the user. FIG. 4 shows a concrete example of the structure of a communication profile list (wireless LAN setting list) 301 set for a plurality of communication profiles. FIG. 5 shows a concrete example of the AP list 401. FIG. 6 shows an example of a communication profile selection process sequence using these lists. FIG. 7 shows another example of the communication profile selection process sequence. FIG. 10 shows a concrete example of the structure of the wireless LAN priority condition setting window.

The host bridge 102 is a bridge device which connects the CPU 101 and system controller 105. The host bridge 102 incorporates a memory controller (not shown) which controls access to the main memory 103.

Figure 8:
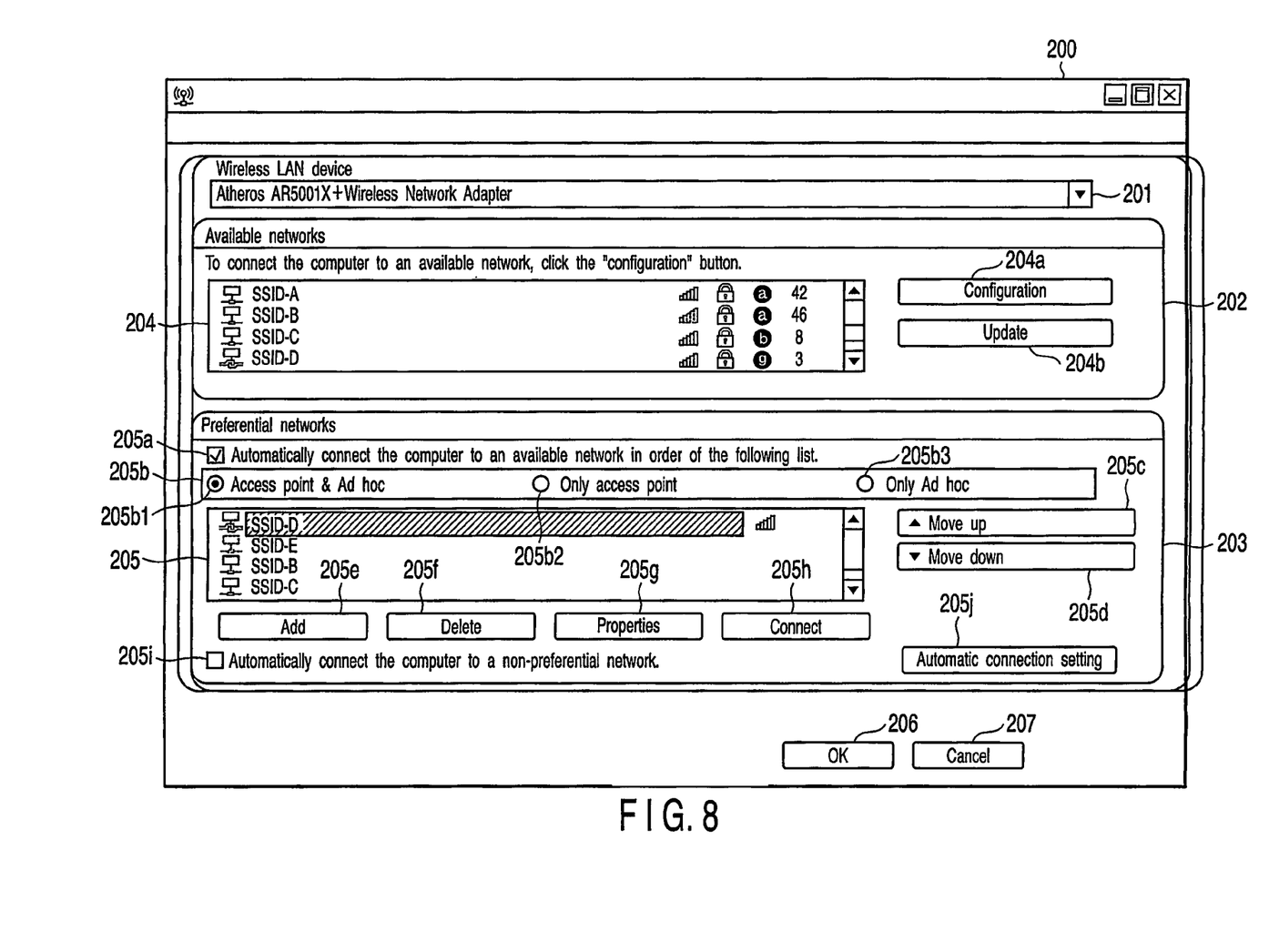
FIG. 8 is a schematic view showing an example of an initial setting window applied to the information processing apparatus according to the embodiment of the present invention.
Figure 9:
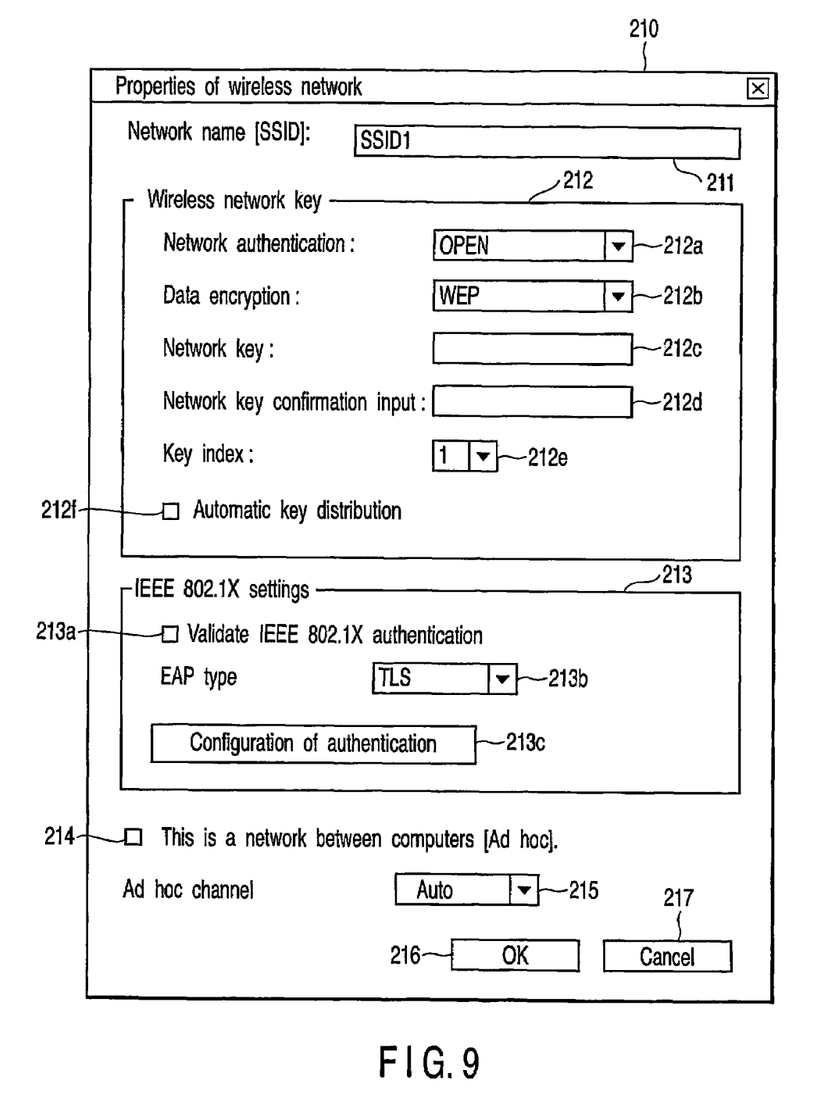
FIG. 9 is a schematic view showing an example of a communication profile setting window applied to the information processing apparatus according to the embodiment of the present invention.

The display controller 104 controls the display (DISP) 32 which adopts, e.g., an LCD and is used as the display monitor of the personal computer 30. In the embodiment, the display (DISP) 32 displays, under the control of the communication environment control program 140, the initial setting window 200 for allowing automatic switching of the wireless LAN (access point 20), as shown in FIG. 8, a communication profile setting window 210 as shown in FIG. 9, and a condition setting window 220 for setting a condition for selecting a wireless LAN (communication profile), as shown in FIG. 10.

The system controller 105 controls devices on a PCI bus 126 and devices on an ISA bus 128. The system controller 105 incorporates an IDE controller (not shown) for controlling the hard disk drive (HDD) 106.

The communication control program 130 is installed in advance as one of utility programs in the hard disk drive 106. In the above-described monitoring process for the peripheral access points 20, the communication control program 130 receives beacons transmitted from the access points 20, and acquires pieces of access point information for the discovered access points (from which beacons are received). A list of pieces of information of the access points 20 that are acquired by reception of beacons is held as the AP list 401 in the database (DB) 31 of the hard disk drive 106. The AP list 401 held in the database 31 is updated at a predetermined time interval or upon occurrence of a predetermined event such as a change in communication environment or link-down at the access point. Every time the AP list 401 is updated, it is written in the main memory 103.

The communication environment control program 140 is installed in advance as one of utility programs in the hard disk drive 106. As described above, the communication environment control program 140 is executed by, e.g., selecting an icon from the start menu or task tray by the user. The communication environment control program 140 provides the user with the initial setting window 200 for allowing automatic switching of the wireless LAN (access point 20), as shown in FIG. 8. Together with the AP list 401, the database 31 holds the wireless LAN setting list 301 which is set using the initial setting window 200 and serves as a list of the communication profiles of the access points 20. Further, the database 31 further holds a connection condition 402 which is set using the condition setting window 220 (FIG. 10) displayable from the initial setting window 200 and is used to select a wireless LAN (communication profile) to be automatically connected. The wireless LAN setting list 301, AP list 401, and connection condition 402 which are held in the database 31 are loaded to the main memory 103, and referred to in the subsequent communication profile selection process executed by the communication environment control program 140.

The wired LAN device 107 is a device for connecting the personal computer 30 to a wired network. Although not shown, the wired LAN device 107 communicates with the wired network via a wired LAN cable connected to a LAN connector.

The wireless LAN device 108 is a wireless network device such as a wireless LAN card for connecting the personal computer 30 to a wireless network. The wireless LAN device 108 is formed from a baseband unit and RF unit. The RF unit transmits/receives radio signals via an antenna (ANT) 109. The wireless LAN device 108 is so constructed as to execute wireless communication in accordance with the standard such as IEEE 802.11a, IEEE 802.11b, or IEEE 802.11g. Upon reception of a beacon (RB) transmitted from the access point 20, the wireless LAN device 108 notifies the CPU 101 of a message to this effect, and executes acquisition of access point information and communication via the access point under the control of the CPU 101.

The embedded controller/keyboard controller IC (EC/KBC) 111 is a single-chip microcomputer in which an embedded controller for managing power and a keyboard controller for controlling a keyboard 112 are integrated. The embedded controller/keyboard controller IC (EC/KBC) 111 has a function of ON/OFF-controlling power of the personal computer 30 in accordance with the operation of the power button by the user.

FIG. 4 shows an example of the wireless LAN setting list 301 serving as a list of communication profiles set for a plurality of access points 20 on the communication profile setting window 210 (FIG. 9) which is opened from the initial setting window 200. An SSID for each available access point, an infrastructure mode (infrastructure/ad hoc), an authentication mode (OPEN/SHARED/WPA/WPA-PSK), security information (OPEN/SHARED=Disabled/WEP/AES, WPA/WPA-PSK=TKIP/AES), and the like are set in the wireless LAN setting list 301. Also, a network key, a key index, whether to automatically distribute a key, and whether to validate/invalidate IEEE 802.1X authentication are set as other pieces of information. FIG. 9 shows a concrete example of the structure of the communication profile setting window 210 used for this setting. The SSID is an identifier (ID) for grouping access points, and the ad hoc (Ad hoc) is a network between computers.

More specifically, the setting window 210 shown in FIG. 9 comprises a network name input box 211, wireless network key setting box 212, IEEE setting box 213, Ad hoc check button 214, Ad hoc channel setting button 215, OK button 216, and cancel button 217. The wireless network key setting box 212 comprises a network authentication setting box 212*a*, data encryption setting box 212*b*, network key input box 212*c*, network key confirmation input box 212*d*, key index setting box 212*e*, and automatic key distribution setting button 212*f*. The IEEE setting box 213 comprises an IEEE authentication validation setting button 213*a*, EPA type setting box 213*b*, and authentication configuration setting box 213*c*. The wireless LAN setting list 301 as shown in FIG. 4 is created by setting necessary input items by using the setting window 210 having this structure.

A list of wireless LANs (access points 20) complying with the contents of the wireless LAN setting list 301 is displayed in a wireless LAN display column 205 within a "preferential network" setting area 203 on the initial setting window 200 shown in FIG. 8.

FIG. 5 shows an example of the AP list 401 serving as a list of pieces of information of peripheral access points that are acquired by the monitoring process of the communication control program 130. The SSIDs/BSSIDs, infrastructure modes, key states, radio field strengths, channels, and communication methods of discovered access points 20 are set in the AP list 401. The BSSID (basic service set identify) is an ID for authenticating a communication terminal or the like in the MAC layer. The BSSID can be recognized by receiving a beacon (RB) transmitted from the access point 20, similar to the SSID.

A list of wireless LANs (access points) complying with the contents of the AP list 401 shown in FIG. 5 is displayed in a wireless LAN display column 204 within an "available network" setting area 202 on the initial setting window 200 shown in FIG. 8.

FIG. 6 is a flowchart showing an example of the communication profile selection process sequence executed by the communication environment control program 140. In the communication profile selection process shown in FIG. 6, the communication profile selection process is executed upon a change in communication environment with respect to the access point 20.

FIG. 7 is a flowchart showing another example of the communication profile selection process sequence executed by the communication environment control program 140. In the communication profile selection process shown in FIG. 7, the communication profile selection process is executed upon occurrence of link-down during communication.

FIG. 8 shows an example of the structure of the initial setting window 200 for allowing automatically switching the wireless LAN (access point). The initial setting window 200 comprises a "wireless LAN device" selection area 201, the "available network" setting area 202, the "preferential network" setting area 203, an OK button 206 for validating input contents, and a cancel button 207 for canceling input contents.

The "wireless LAN device" selection area 201 allows selecting one of mounted wireless LAN devices when a plurality of wireless LAN devices (wireless LAN cards) are mounted.

The wireless LAN display column 204 in the "available network" setting area 202 selectively displays a list of wireless LANs (access points 20) complying with the contents of the AP list 401 shown in FIG. 5. A wireless LAN (access point 20) is selected in the wireless LAN display column 204, a "configuration" button 204*a* in the "available network" setting area 202 is clicked, and then the communication profile setting window 210 shown in FIG. 9 is opened. By inputting necessary information using this window, the communication profile of the wireless LAN (access point 20) selected in the wireless LAN display column 204 can be created. By clicking an "update" button 204*b* in the "available network" setting area 202, the contents of the AP list 401 displayed in the wireless LAN display column 204 can be updated (the AP list 401 can be updated by rediscovering the access point 20).

The wireless LAN display column 205 in the "preferential network" setting area 203 selectively displays a list of wireless LANs (access points 20) complying with the contents of the wireless LAN setting list 301 shown in FIG. 4. Whether to automatically switch wireless LAN connection can be set by an "automatically connect the computer to an available network in the order of the following list" check box 205*a* in the "preferential network" setting area 203. By checking the check box 205a, wireless LAN connection is automatically switched in accordance with the order (priorities) of wireless LANs (access points) displayed in the wireless LAN display column 205. The type (infrastructure mode) of network to be connected by the wireless LAN can be selected by selecting an "access point & Ad hoc" radio button 205b1 of a selection radio button 205b in the "preferential network" setting area 203. The priority in automatic switching of the wireless LAN setting can be changed with a "move up" button 205c and "move down" button 205d in the "preferential network" setting area 203. The communication profile setting window 210 shown in FIG. 9 can be opened to create a communication profile by clicking an "add" button 205e in the "preferential network" setting area 203. A wireless LAN selected from the wireless LAN list displayed in the wireless LAN display column 205 can be deleted by clicking a "delete" button 205f in the "preferential network" setting area 203. The communication profile setting window 210 shown in FIG. 9 can be opened, and a saved communication profile can be referred to and changed by clicking a "properties" button 205g in the "preferential network" setting area 203. A wireless LAN (access point 20) which is selected from the wireless LAN list displayed in the wireless LAN display column 205 and complies with the communication profile can be manually connected by clicking a "connect" button 205h in the "preferential network" setting area 203. By checking an "automatically connect the computer to a non-preferential network" check box 205i in the "preferential network" setting area 203, an unkeyed peripheral access point 20 can be automatically connected regardless of the communication profile set in the wireless LAN setting list 301.

The condition setting window 220 (FIG. 10) for setting a condition for selecting a wireless LAN (communication profile), i.e., automatically connecting the personal computer 30 to the access point 20 is opened by clicking an "automatic connection setting" button 205j in the "preferential network" setting area 203. Automatic connection can be set on the condition setting window 220.

FIG. 9 shows an example of the structure of the communication profile setting window 210 opened on the initial setting window 200. Input items on the communication profile setting window 210 can be easily understood from the contents of the wireless LAN setting list 301 shown in FIG. 4 and existing communication profiles, and a description thereof will be omitted.

FIG. 10 shows an example of the structure of the condition setting window (automatic connection setting window) 220 which is opened by clicking the "automatic connection setting" button 205j in the "preferential network" setting area 203 shown in FIG. 8 and is used to set a condition for selecting a communication profile, i.e., automatically connecting the personal computer 30 to the access point 20. The condition setting window 220 provides a left list box 221 and right list box 222. Available conditions in automatic switching of the wireless LAN (communication profile) are prepared in the left list box 221. Of various conditions prepared in the left list box 221, conditions used for automatic switching of the wireless LAN (communication profile) are set in the order of priority in the right list box 222. The radio field strength, security level, communication speed, channel, and the wireless LAN list displayed in the wireless LAN display column 205 are prepared in the left list box 221 as conditions for selecting a communication profile, i.e., automatically connecting the personal computer 30 to an access point. A condition for use is selected in the left list box 221, a ">" button 221a is clicked, and then the condition selected in the left list box 221 is moved (set) to the right list box 222. Also, a condition is selected in the right list box 222, and a "<" button 221b is clicked, and the condition selected in the right list box 222 is returned to the left list box 221, thereby canceling the setting. By clicking a "move up" button 222a, a condition can be selected in the right list box 222 to raise the priority. By clicking a "move down" button 222b, a condition can be selected in the right list box 222 to lower the priority.

The condition setting window 220 comprises an OK button 223a for reflecting contents set in the right list box 222, a cancel button 223b for canceling set contents, and an apply button 223c for validating set contents.

By using the condition setting window 220, a communication profile can be selected, in other words, one or a plurality of conditions for automatically connecting the personal computer 30 to the access point 20 can be set. At this time, setting conditions are set in the order of priority at a plurality of condition settings.

Various pieces of information for automatic wireless LAN switching that are set using the initial setting window 200, communication profile setting window 210, and condition setting window 220 shown in FIGS. 8, 9, and 10 are reflected in automatic communication profile selection, i.e., an automatic connection process to the access point 20 that is executed by the communication environment control program 140.

An example of the automatic communication profile selection process will be explained with reference to the flowchart shown in FIG. 6.

The CPU 101 executes at, e.g., a predetermined time interval the communication control program 130 stored in the main memory 103, and monitors and discovers the peripheral access points 20(A), 20(B), 20(C), 20(D), . . . . The CPU 101 executes a process of acquiring pieces of information (the network names of the access points, the communication speeds of the communication devices, the security levels, the communication channels, and the radio field strengths) of the discovered access points 20 (from which beacons are received). The CPU 101 executes the communication environment control program 140 stored in the main memory 103, in accordance with an instruction input for automatic wireless LAN connection by, e.g., selection of an icon by the user from the start menu or task tray. The CPU 101 executes the automatic communication profile selection process shown in FIG. 6 after a setting process based on the initial setting window 200.

In the process shown in FIG. 6, the communication control program 130 monitors the access points 20(A), 20(B), 20(C), 20(D), . . . which exist around the computer 30 and can communicate with the wireless LAN device 108. If a communicable access point is discovered, pieces of predetermined access point information such as the network name of the access point 20, the communication speed of the communication device, the security level, the communication channel, and the radio field strength are acquired and transferred to the communication environment control program 140 (step S11). The communication environment control program 140 updates the contents of the AP list 401 on the basis of the pieces of information of the discovered access point 20 (step S12). The contents of the updated AP list 401, pieces of information set in the wireless LAN setting list 301, and the connection condition 402 for selecting a communication profile are collated with each other (step S13). Whether a communication profile in the best communication environment which meets the connection condition much more than the current communication environment targeting the access point exists is determined (step S14). If no communication profile in the best communication environment which meets the connection condition much better than the current communication environment exists, the process ends without executing the automatic access point switching process by switching of the communication profile (NO in step S14). If a communication profile in the best communication environment which meets the connection condition exists (YES in step S14), the communication profile is selected from the wireless LAN setting list 301, and the communication profile for use is switched to the selected one to automatically switch the access point 20 (step S15).

Another example of the automatic communication profile selection process will be explained with reference to the flowchart shown in FIG. 7.

In the process shown in FIG. 7, the automatic communication profile selection process by the communication environment control program 140 is not executed until the communication control program 130 detects a link-down state (step S21 and NO in step S22). If the communication control program 130 detects link-down, the communication environment control program 140 receives a notification to this effect, and updates the contents of the AP list 401 on the basis of information of the discovered access point 20 (step S23). The contents of the updated AP list 401, pieces of information set in the wireless LAN setting list 301, and the connection condition 402 for selecting a communication profile are collated with each other (step S24). A communication profile in the current best communication environment which targets the access point 20 and meets the connection condition is selected. The personal computer 30 is automatically connected to the access point 20 by using the selected communication profile (step S25).

As has been described above, the present invention can implement a user-friendly information processing apparatus and information processing method capable of reflecting the user's application purpose, environment, and the like with respect to a peripheral wireless device and automatically switching setting to an access point 20 in a preferable communication environment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An information processing apparatus having a communication apparatus which is configured to perform network connection via a wireless relay apparatus, the information processing apparatus comprising:

an information acquisition unit which is adapted to acquire information of discovered wireless relay apparatuses by discovering the wireless relay apparatuses communicable with the communication apparatus, wherein the information acquisition unit discovers the communicable wireless relay apparatuses by receiving beacons from wireless relay apparatuses present around the information processing apparatus, and acquires a network name, a communication speed, a security level, a communication channel, and a radio field strength of each wireless relay apparatus as the information of each wireless relay apparatus;

a profile setting unit which is configured to set communication profiles for the wireless relay apparatuses discovered by the information acquisition unit;

a priority condition setting unit which is configured to set a priority condition for determining priorities of the communication profiles to be used by the communication apparatus, wherein the priority condition setting unit sets the priority condition based on the communication speed, the security level, the communication channel, and the radio field strength;

an order determination unit which is configured to determine priorities for the communication profiles set by the profile setting unit on the basis of the priority condition set by the priority condition setting unit; and a profile determination unit which is configured to determine a communication profile to be used by the communication apparatus based on the priorities determined by the order determination unit.

2. The apparatus according to claim 1, further comprising a storage device which is adapted to store information acquired by the information acquisition unit.

3. The apparatus according to claim 1, further comprising:

a connection determination unit which is configured to determine whether to automatically connect the communication apparatus to the wireless relay apparatus in which the communication profile determined by the profile determination unit is set; and a connection processing unit which, when the connection determination unit determines to automatically connect the communication apparatus to the wireless relay apparatus, is configured to perform a connection process between the communication apparatus and the wireless relay apparatus in which the communication profile is set, by using the communication profile determined by the profile determination unit.

4. The apparatus according to claim 3, further comprising:

a change recognition unit which is configured to recognize a change in communication environment between the wireless relay apparatus and the communication apparatus on the basis of a communication content between the wireless relay apparatus and the communication apparatus which have undergone the connection process by the connection processing unit; and a profile change unit which is configured to change a currently set communication profile to another communication profile in accordance with a content when the change recognition unit recognizes the change in the communication environment.

5. The apparatus according to claim 3, further comprising a profile change unit which is configured to change a currently set communication profile to another communication profile when a fault occurs in the communication apparatus.

6. A method of connecting a network via a wireless relay apparatus by using a communication apparatus, comprising:

discovering wireless relay apparatuses communicable with the communication apparatus by receiving beacons from the wireless relay apparatuses to acquire information of the discovered wireless relay apparatuses, the information including a network name, a communication speed, a security level, a communication channel, and a radio field strength of each wireless relay apparatus;

setting communication profiles for the discovered wireless relay apparatuses;

setting a priority condition for determining priorities of the communication profiles to be used by the communication apparatus based on the communication speed, the security level, the communication channel, and the radio field strength;

determining priorities for the set communication profiles based on the set priority condition; and determining a communication profile to be used by the communication apparatus in accordance with the determined priorities.

7. The method according to claim 6, further comprising storing the acquired information in a storage device.

8. The method according to claim 6, further comprising:

determining whether to automatically connect the communication apparatus to the wireless relay apparatus in which the determined communication profile is set; and when the communication apparatus is determined to be automatically connected to the wireless relay apparatus, performing a connection process between the communication apparatus and the wireless relay apparatus in which the communication profile is set, by using the determined communication profile.

9. The method according to claim 8, further comprising:

recognizing a change in communication environment between the wireless relay apparatus and the communication apparatus on the basis of a communication content between the wireless relay apparatus and the communication apparatus which have undergone the connection process; and changing a currently set communication profile to another communication profile in accordance with a content when the change in the communication environment is recognized.

10. The method according to claim 8, further comprising changing a currently set communication profile to another communication profile when a fault occurs in the communication apparatus.

* * * * *